Feb. 15, 1966 R. S. BRUMM ETAL 3,234,960
CONTROL MEANS FOR CONTROLLING THE LOADING
PRESSURE OF A PRESSURE REGULATOR
Filed Feb. 16, 1962 13 Sheets-Sheet 1

INVENTOR.
RICHARD S. BRUMM
BERTRAM L. MORRISON
BY
Edward B. Gregg
Attorney

INVENTOR.
RICHARD S. BRUMM
BY BERTRAM L. MORRISON
Edward B. Beggs
Attorney

INVENTOR.
RICHARD S. BRUMM
BERTRAM L. MORRISON
BY
Attorney

Feb. 15, 1966     R. S. BRUMM ETAL     3,234,960
CONTROL MEANS FOR CONTROLLING THE LOADING
PRESSURE OF A PRESSURE REGULATOR
Filed Feb. 16, 1962     13 Sheets-Sheet 12

INVENTOR.
RICHARD S. BRUMM
BY BERTRAM L. MORRISON
Attorney

INVENTOR.
RICHARD S. BRUMM
BERTRAM L. MORRISON
BY
Attorney

United States Patent Office 3,234,960
Patented Feb. 15, 1966

3,234,960
CONTROL MEANS FOR CONTROLLING THE LOADING PRESSURE OF A PRESSURE REGULATOR
Richard S. Brumm and Bertram L. Morrison, Oakland, Calif., assignors to Grove Valve and Regulator Company, Oakland, Calif., a corporation of California
Filed Feb. 16, 1962, Ser. No. 173,675
6 Claims. (Cl. 137—510)

This invention relates to a pressure regulator.

More particularly, this invention relates to a pressure control device for connecting a source of gas under pressure to a mechanism or system which is to be pressurized, such control device being effective to regulate the pressure delivered to such mechanism or system regardless of fluctuations of inlet pressure, such control device being readily adjustable to control the outlet pressure as desired.

The pressure regulator of the present invention is of the dome type in which a pressure responsive member such as a diaphraghm acts on the main valve and in turn is acted upon by pressure in a chamber or dome, such dome pressure being variable to adjust the outlet pressure of the regulator.

In the art of pressure regulators it is necessary to receive gas under pressure from a region of high pressure which may vary from time to time and which may be greatly in excess of the outlet pressure.

In regulators of this type it is desirable to provide certain safety factors, such as means to avoid excessively rapid loading (which tends to cause "overshooting" of the desired loading pressure); means to prevent slow leakage of pressure from the high pressure inlet to the dome; means to effect venting of the dome and depressurizing at either a slow, easily controlled rate or at a rapid rate; means to vent dome pressure rapidly and/or automatically in the event of an emergency such as a power failure, etc.

It is an object of the present invention to provide improvements in the field of pressure regulators.

It is a more particular object of the invention to provide improvements in dome-type pressure regulators.

It is another and more particular object of the invention to provide a means of loading and venting dome-type regulators which is safe and fool-proof in its operations, which permits adjustment to increase or decrease the dome pressure at will; and which provides a safety means whereby, in certain events such as power failure, a rapid venting of the dome and closing of the main valve is accomplished.

Yet another object of the invention is to provide a pressure regulator of the general character described which has simplified construction and operation and which is operable manually or by electrical means, as desired.

The above and other objects of the invention will be apparent from the ensuing description and appended claims.

Certain forms of the invention are illustrated by way of example in the accompanying drawings in which:

FIGS. 5, 6, 7 and 8 are diagrammatic, vertical sectional views of the regulator of FIGS. 1, 2 and 3 showing different stages of operation. FIG. 5 shows the condition of the regulator during loading of the dome. FIG. 6 shows the condition of the regulator during steady state operation. FIG. 7 shows the condition of the regulator during controlled, slow venting of the dome. FIG. 8 shows the condition of the regulator during emergency or rapid venting of the dome.

FIGS. 17, 18 and 19 are diagrammatic views of the regulator of FIGS. 9 and 10 showing the same in different stages of operation. FIG. 17 shows the condition of the regulator during loading of the dome. FIG. 18 shows the condition of the regulator during steady state operation. FIG. 19 shows the condition of the regulator during venting.

Figure 1:
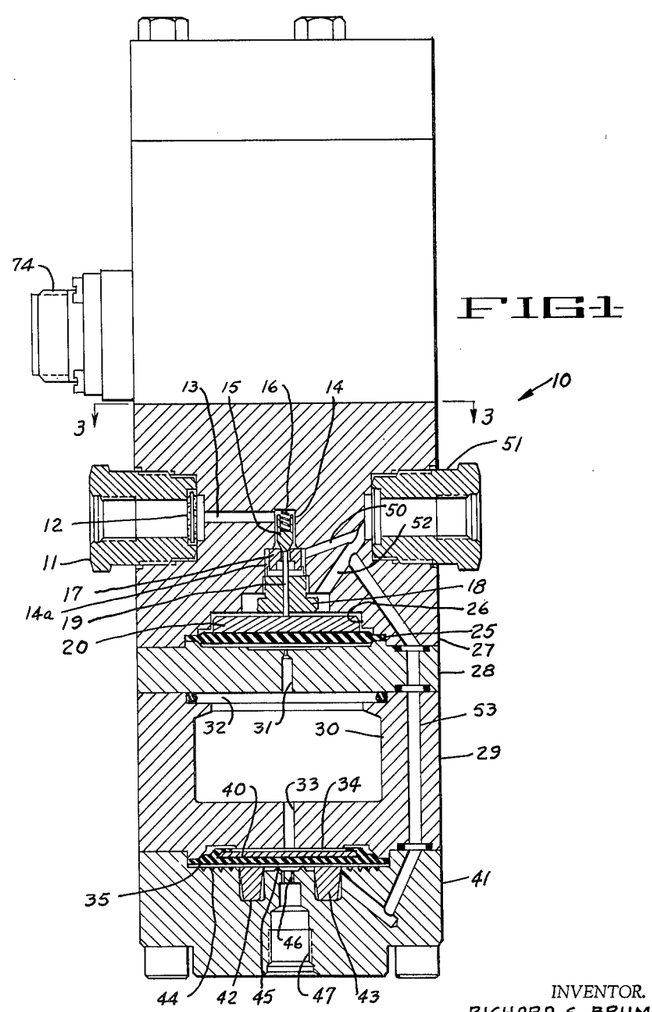
FIG. 1 is a section taken through the pressure regulator which constitutes one embodiment of the invention, such being a vertical section taken along the line 1—1 of FIG. 3. The solenoid section of the regulator is shown in side elevation.
Figure 2:
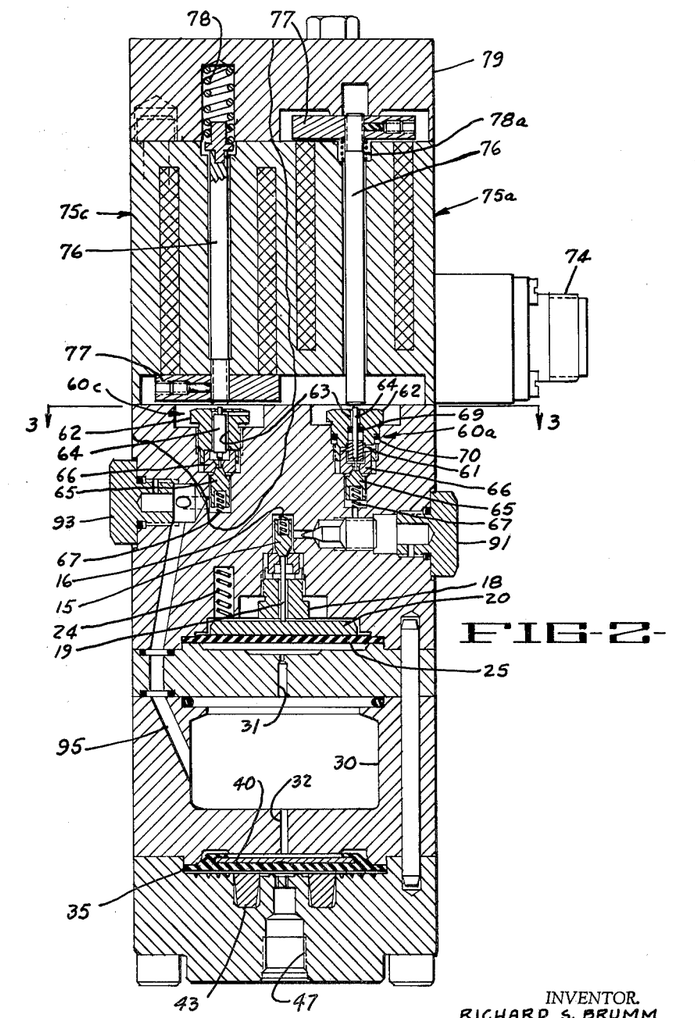
FIG. 2 is a staggered section taken along the line 2—2 of FIG. 3. However, the portion of this figure which is partially enclosed by an irregular solid line is a view taken along the line 2–2′ of FIG. 3.

Referring now to FIGS. 1 to 8 of the drawings, and primarily to FIGS. 1 and 2, a pressure regulator is shown which is generally designated by the reference number 10. It has an inlet fitting 11 which is provided with a filter 12 and which communicates with an inlet passage 13 which in turn communicates with a chamber 14 within which a main valve member 15 is slidably disposed. As illustrated, the main valve 15 is socketed at its upper end to receive a spring 16 which urges the valve 15 into closed position against a seat ring 17, which is supported by a nut 18. The nut 18 is threaded into a portion of the cavity or chamber 14 formed in the body of the device. The nut 18 is formed with an axial passage which slidably receives a thrust pin 19 whose lower end contacts a plate 20. The plate 20 is supported by a regulating diaphragm 26. The plate 20 is slidable within and is guided by the walls of a cylindrical cavity 26. Compression springs 24 (one of which is shown in FIG. 2) bear against the upper surface of plate 20. The diaphragm 25 is clamped between a block 27 (which forms a part of the regulator body) and a plate 28. Suitable capscrews likewise one or more dowels as shown in FIG. 2, are provided to clamp and align the various parts of the regulator body. Another part of the body of the regulator is a block 29 which is located beneath the plate 28 and which is formed with a cavity or dome 30. The dome 30 communicates via a passage 31 with the underside of the regulating diaphragm 25, and a resilient O-ring is provided at 32 to effect a seal so that pressure within the dome cannot leak outwardly. Another passage is formed at 33 to communicate dome pressure to the upper side of a chamber 34. Within the chamber 34 is clamped a relief diaphragm 35 which is affixed to a stiffener plate 40. The lowermost segment of the body of the regulator 10 is a block 41 which is formed with a rather deep annular groove 42 to receive a support ring 43. The block 41 is also formed with grooves 44 which may be either concentric or spiral. One or more radial slots (not shown) are cut across the grooves 44 for a purpose explained hereinafter. An upwardly projecting annular rib 45 is provided which normally contacts and seals against the bottom surface of the diaphragm 35. A vent passage is provided at 46 which communicates with a threaded opening 47 to which a fitting, for example, a metal connector for an exhaust tube, can be connected.

A chamber 14a on the downstream side of the main valve member 15 is connected by a passage 50 to an outlet fitting 51. A passage 52 serves to connect the outlet passage with the chamber 26 above the regulating diaphragm 25. Another passage 53 serves to connect the outlet 51 with the underside of the relief diaphragm 35.

Figure 5:
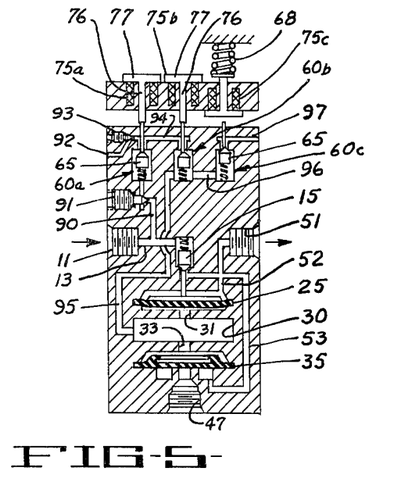

Referring now to FIG. 5, which is one of the digramatic drawings, as will be seen there are three control valves which are designated as 60a, 60b and 60c. The valve 60a is the loading valve, the valve 60b is the normal, slow venting valve and the valve 60c is the emergency or rapid venting valve. For convenience, in the diagrammatic views of FIGS. 5 to 8, the valves 60a, 60b and 60c are shown as being in line. However, as will be seen from FIG. 3, these valves are arranged symmetrically about the longitudinal axis of the regulator 10. These three control valves—that is the valves 60a, 60b, and 60c—are essentially identical in structure. The valve 60c will now be described with reference to FIG. 2. (In the valves 60a and 60b identical parts are identically numbered, and in the description of the valves 60a and 60b only those features will be specifically described which differ from valve 60c.)

Referring now to FIG. 2, the emergency or rapid venting valve 60c is located in a chamber 61 formed in the body block 27. It comprises a nut 62 threaded into the chamber 61, such a nut having an axial passage 63 which slidably receives a thrust pin 64 which functions in the manner hereafter described to unseat a valve member 65 from its seat ring 66. A coil spring urges the valve member 65 into engagement with its seat ring 66.

Figures 3, 4:
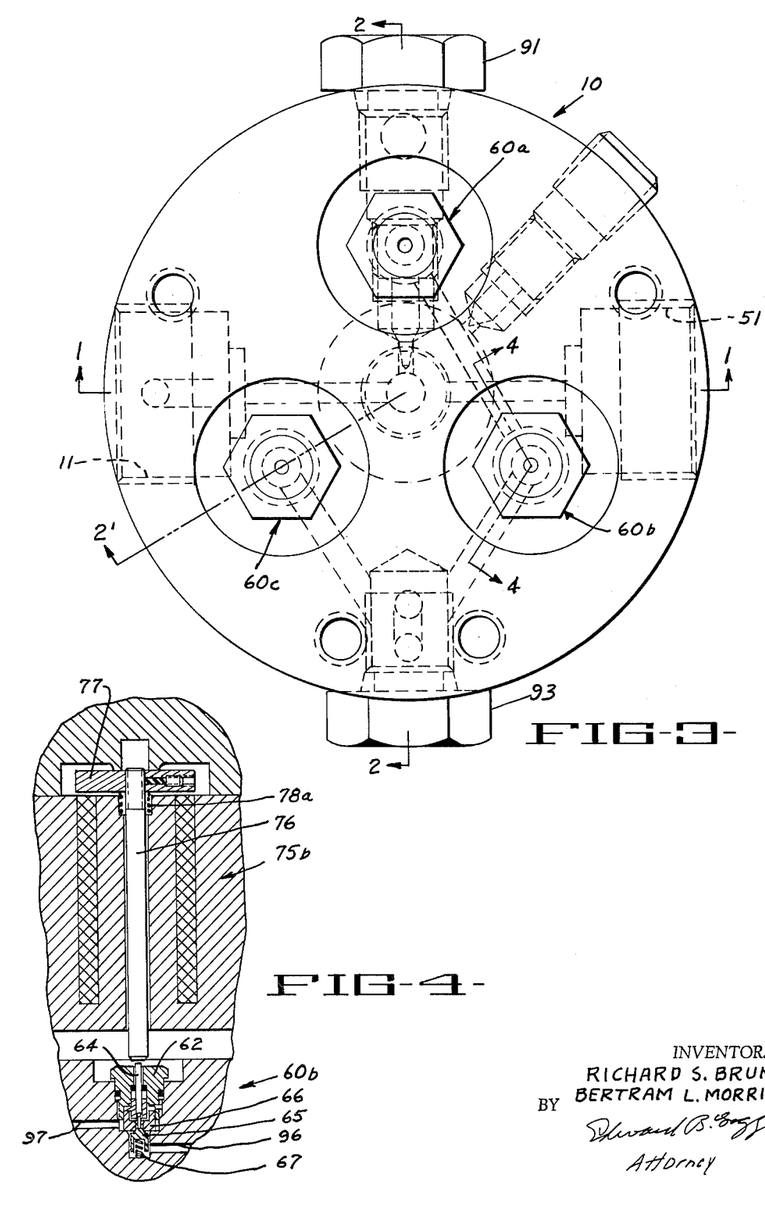
FIG. 3 is a top plan view taken along the line 3—3 of FIG. 2.
FIG. 4 is a fragmentary, vertical sectional view taken along the staggered line 4—4 of FIG. 3, showing one of the control valves (the normal or controlled venting valve).

The control valves 60a and 60b are very similar to control valve 60c, but as will be seen in FIG. 2 (loading valve 60a) and FIG. 4 (controlled venting valve 60b) each of these valves has resilient O-ring seals at 69 and 70 whose functions will become apparent from a reading of the operation of these valves described hereinbelow.

The valve 60c is also provided with an operating mechanism in the form of a solenoid 75c. The control valves 60a and 60b are similarly provided with solenoids 75a and 75b respectively, both of which are identical with solenoid 75c except as described hereinafter. An electrical connector is shown at 74 for the solenoids. The solenoids 75a and 75b are normally de-energized and the solenoid 75c is normally energized. Each of these solenoids comprises an axial rod 76 and a ferromagnetic or armature plate 77 fixed to one end of the rod. In the case of the solenoid 75c the plate 77 is affixed to the lower end of its rod 76 and a spring 78 acts against the upper end of the rod 76 so that, when the solenoid 75c, is de-energized its rod 76 and plate 77 will drop, thereby contacting the corresponding thrust pin 64 and unseating the valve member 65 of the valve 60c. In contrast to this, each of the solenoids 75a and 75b has its plate 77 affixed to the upper end of its axial rod 76 and, when these solenoids are energized, the lower ends of their axial rods 76 will contact the corresponding thrust pins 64 of the respective valves 60a and 60b, thereby unseating the respective valve members 65. When the solenoids 75a and 75b are de-energized their axial rods 76 are removed from contact with their respective thrust pins by springs 78a and the valves 60a and 60b will close.

Operation of the regular 10 during loading thereof will now be described with reference to FIG. 5. The solenoids 75a, 75b and 75c are energized. As explained above, the rapid vent valve 60c is closed when its solenoid 75c is energized and the valves 60a and 60b are open when their solenoids 75a and 75b, respectively, are energized. This is the condition of the solenoids and valves shown in FIG. 5; i.e., valves 60a and 60b are open and valve 60c is closed. Therefore, inlet pressure is communicated through a passage 90 to the chamber 61 beneath the valve member 65 of loading valve 60a. The passageway 90 is restricted by a needle valve 91 which is adjusted so that the supply pressure to loading valve 60a occurs at the desired rate to prevent loading too rapidly and consequent "overshooting" of the desired loading pressure. A bleed passage 92 is provided which is controlled by a needle valve 93. The purpose of the bleed passage 92 is explained hereinafter. Pressure passing through valve 60a also passes through a passageway 94 to the valve 60b. Inasmuch as this valve is open, pressure passes through the valve 60b into passage 95, thence into the loading chamber or dome 30. The pressure in dome 30 is applied to the underside of the regulating diaphragm 25 and therefore opposes the spring 16 and unseats main valve 15. Loading of the dome 30 and passage of pressure from inlet 11 to outlet 15 is continued in this manner until the desired outlet pressure is reached, as determined by a gauge (not shown).

Figure 6:
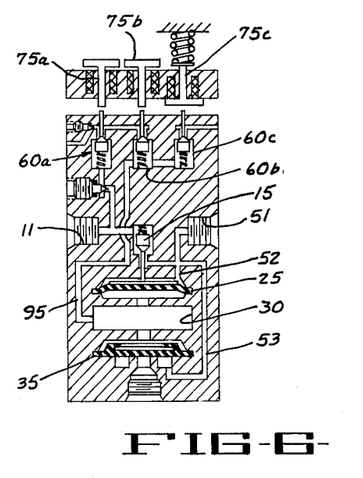

Referring now to FIG. 6, when the desired outlet pressure is reached the solenoids 75a and 75b are de-energized. This results in closing the valves 60a and 60b, as indicated in FIG. 6. Valve 60c remains closed because solenoid 75c remains energized. Therefore, no further pressure can reach the dome or loading chamber 30 through valves 60a and 60b and passageway 95. Should the pressure in outlet 51 rise above the desired value for which the regulator has been set, it is communicated via the passage 52 to the upper side of the regulating diaphragm 25, which will oppose the dome pressure and cause the main valve 15 to move toward closed position. If the pressure in outlet 51 drops below the desired value, the pressure above diaphragm 25 will diminish and dome pressure will move the valve 15 toward a more widely open position. Excess pressure trapped in the outlet 51 and elsewhere in the system which is pressurized is vented through a passageway 53 into the chamber 34 beneath the relief diaphragm 35. As stated above and as shown in FIG. 1, grooves 44 are formed in the bottom of the chamber 34 and, by reason of these grooves and the above-mentioned radial slot, this trapped pressure is applied uniformly to the lower surface of the diaphragm 35, thereby lifting it from the rib 45 and venting to the atmosphere, or to a collecting chamber (not shown) if desired.

Figure 7:
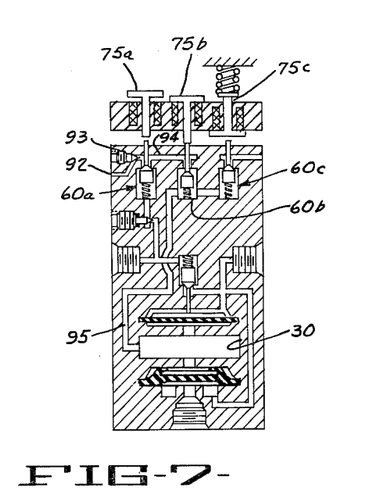

Referring now to FIG. 7, should it be desired to decrease the loading of the dome 30 and thereby decrease the outlet pressure, such can be accomplished by energizing the solenoid 75b. The valves 60a and 60c will remain closed inasmuch as their solenoids 75a and 75c remain, respectively, in de-energized condition and in energized condition. Energization of the solenoid 75b will, however, open the valve 60b as shown in FIG. 7. Therefore, pressure in dome 30 is permitted to pass through passageway 95 and valve 60b to passageway 94, thence out through bleed passage 92 which is controlled by needle valve 93. During this stage of operation the purpose of the needle valve 93 is to retard the rate of pressure reduction in dome 30 to avoid "overshooting" the pressure reduction. The solenoid 75b will be kept in energized condition until the outlet pressure has reached the desired diminished value.

If it is desired at any time to increase the outlet pressure, both solenoids 75a and 75b will be energized. It should be noted that, during loading of the dome 30, a certain amount of gas will escape through bleed passage 93, but this loss is not significant.

Figure 8:
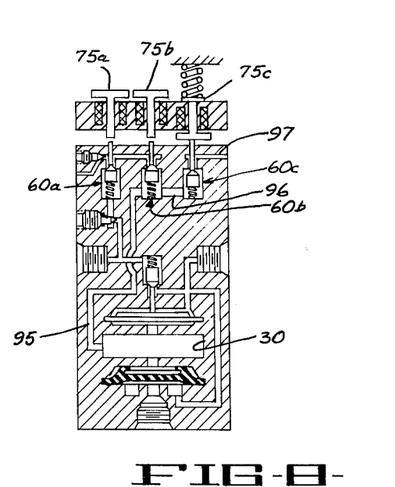

Referring now to FIG. 8, operation during emergency or rapid venting will now be described with reference to that figure.

Assume, for example, that an emergency arises, such as a power failure, and it is important to depressurize the system which is controlled by the regulator 10. Or suppose that, at the end of a day or a shift, or at the conclusion of a given operation, the regulator 10 and the system controlled by it are to be shut down and it is desired to do this rapidly. This is accomplished as follows: The solenoid 75c is de-energized, for example, automatically by a power failure, or manually by an operator who opens a switch. The valves 60a and 60b will remain closed, but the valve 60c will open as shown in FIG. 8. Therefore, pressure from dome 30 passes through passageway 95, the bottom of the cavity in which valve 60b is located, a passageway 96 and the valve 60c to the venting passage 97. This passage has no restriction, therefore it vents the dome rapidly and closes the main valve 15 rapidly. Pressure trapped downstream from the main valve is relieved by means of the relief diaphragm 35, as explained above.

One function of the valve 60b has been described, namely, its use to reduce pressure in dome 30 at a slow, controlled rate when it is desired to reduce the outlet pressure of the regulator. Another function is as follows: If the loading valve 60a were faulty in that it leaked, it would (except for the safety means which will now be described) gradually increase the pressure in dome 30 and gradually increase outlet pressure. This is avoided by providing the valve 60b, which remains closed during steady state operation of the regulator (the condition shown in FIG. 6). Therefore, any leak in valve 60a cannot reach the dome 30, but, instead, is leaked to the atmosphere at 92.

It will be understood that appropriate means (not shown) such as push-button switches will be provided for selectively operating the solenoids 75a, 75b and 75c.

Figure 9:
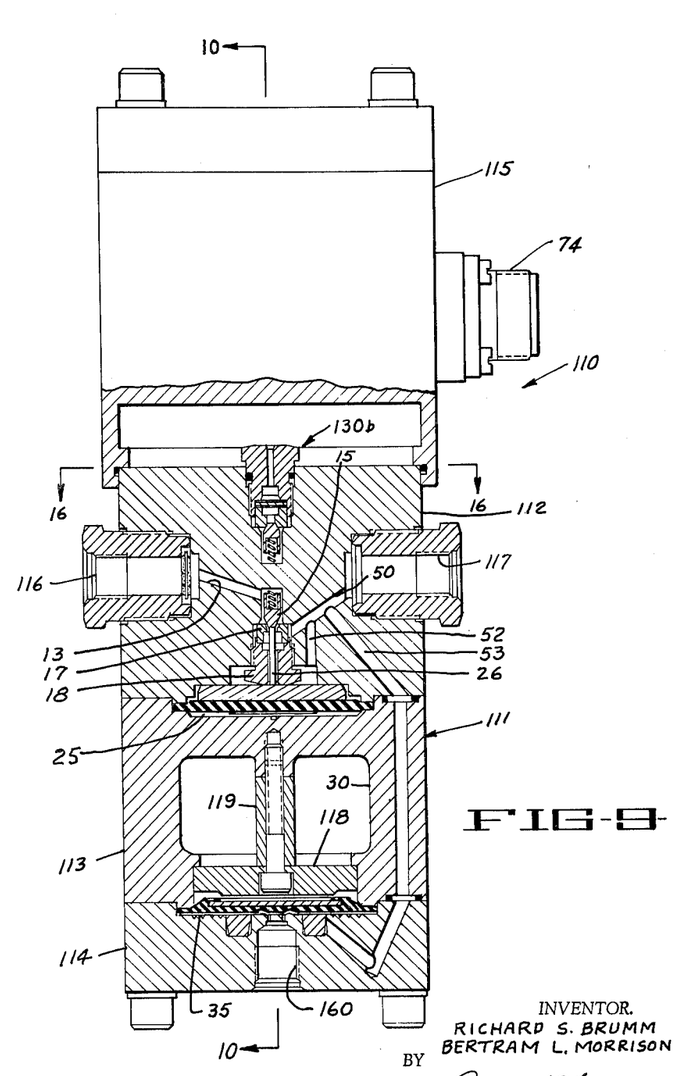
FIG. 9 is a view partly in side elevation and partly in vertical section of another embodiment of the invention, which has a simpler design than the embodiment shown in FIGS. 1 to 8.
Figure 10:
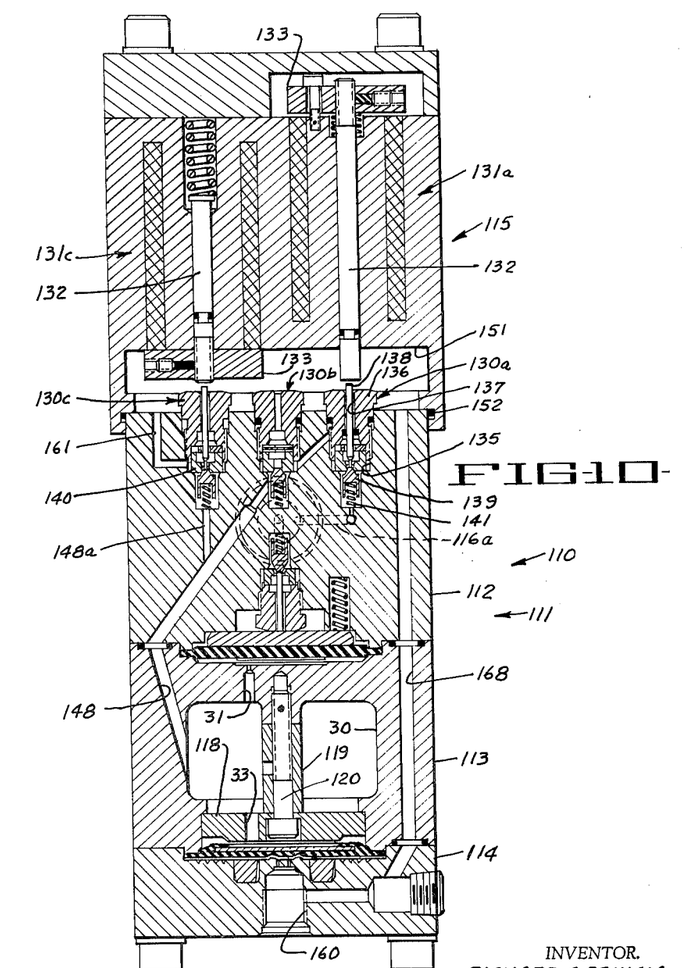
FIG. 10 is a section taken along the line 10—10 of FIG. 9.

Referring now to FIGS. 9 and 10, another embodiment of the invention is there illustrated. This embodiment is similar to that shown in FIGS. 1 to 8 but it has certain modifications which will now be explained.

In the embodiment illustrated in FIGS. 1 to 8, the three control valves 60a, 60b and 60c are controlled by solenoids 75a, 75b and 75c, respectively. In the embodiment shown in FIGS. 9 and 10, there are also three control valves but only two of them are controlled by a solenoid, the third valve being a check valve.

Referring to FIGS. 9 and 10, the regulator there shown is generally indicated by the reference number 110. It comprises a main body member 111 constructed sectionally of a top section 112, a middle section 113 and a bottom section 114 which are clamped together by suitable means such as capscrews. The inlet is shown in FIG. 9 at 116 and the outlet at 117. The main valve construction is the same as shown in FIG. 1 and the connections to this valve are generally the same as in FIG. 1, to such an extent that like parts are indicated by like reference numerals. Certain modifications are apparent in FIG. 9 and also in FIG. 10, such as the fact that the dome 30 has a bottom closure in the form of a plate 118 and is provided with a tubular spacer member 119. The plate 118 and the spacer 119 are clamped together by means of a capscrew 120. It will be seen in FIG. 10 that passages 31 and 33 are provided corresponding to the passages 31 and 33 shown in FIG. 1 to communicate dome pressure to the chamber beneath the regulating diaphragm 25 and to the chamber above the relief diaphragm 35.

The three control valves are shown at 130a, 130b and 130c in FIG. 10. It will be seen that these valves are in line, which is possible because the absence of a third solenoid permits a linear arrangement. Each of these control valves comprises a chamber 135 formed in the body member 112 and a nut 136 threaded into such chamber and formed with an axial passageway 137 which, in the case of the valve 130a and 130c, slidably receives a thrust pin 137 which serves to unseat a valve member 139 from its seat ring 140. Each valve member 139 is urged toward seating, closed valve position by a spring 141.

Figures 11, 12, 13:
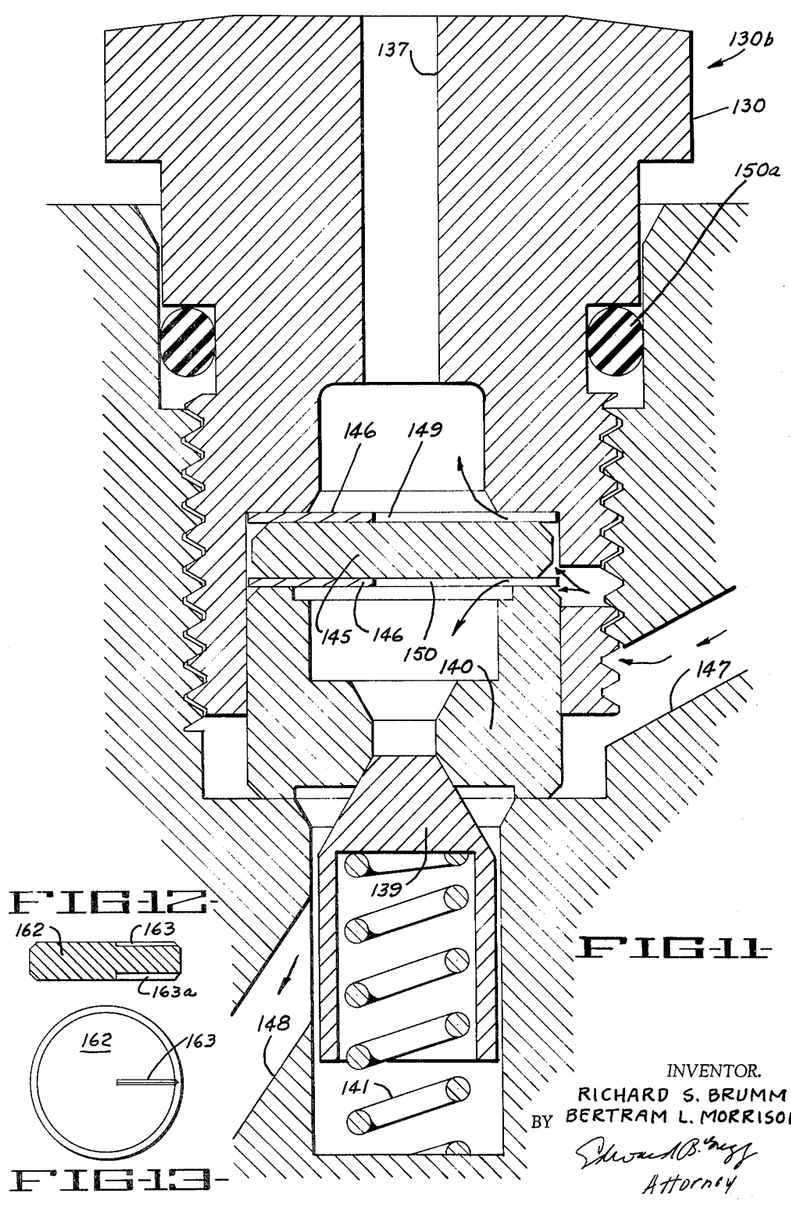
FIG. 11 is a greatly enlarged view of one of the control valves shown in FIG. 10, such view being in vertical midsection.
FIGS. 12 and 13 are, respectively, a vertical midsection and a plan view of a modified orifice element which can be used in the valve of FIG. 11 in place of the orifice elements shown in FIG. 11.

Referring now to FIG. 11, the check valve 130b is there shown on a greatly enlarged scale. As will be seen, between the seat ring 140 and the opposing surface of the nut 136 there are interposed a disc-like spacer member 145 and two very thin, slotted orifice discs 146. One disc 146 is located on top of the spacer 145 and the other disc 146 is located beneath the spacer 145. The inlet side of valve 130b is connected to the load valve 130a by a passage 147 and its outlet side is connected to the dome 30 by a passage 148. The seat ring 140 is held firmly in contact with the bottom of cavity 135 by the nut 136 so that the only way gas can reach the valve member 139 is through the loose thread connection between the nut 136 and the body member 112. If desired or if necessary, an axial slot (not shown) may be formed in one or both of these threads to provide a passageway for gas. A restricted venting orifice is provided at 149 in the form of a slot in the upper orifice disc 146 and a restricted loading orifice is provided in the form of a slot 150 in the lower orifice disc 146. Another feature of the valve construction 130b is the provision of an O-ring seal 150a between the nut 136 and the body member 112.

If desired or if necessary, the orifice discs 146 on top of spacer 145 and/or the orifice discs 146 at the bottom of spacer 145 may be stacked, i.e., two or more discs may be stacked, one upon the other. The purpose of this is to provide a greater degree of control over the effective orifice size and the rate of loading and/or venting. To avoid the possibility that stacked discs may block the gas passage because of mis-alignment of slots 149 and 150, then slots are preferably made along a diameter but longer than a radius. By this means, regardless of the arrangement of a stack of discs, the slots will all intersect and provide a gas passage.

Figure 17:
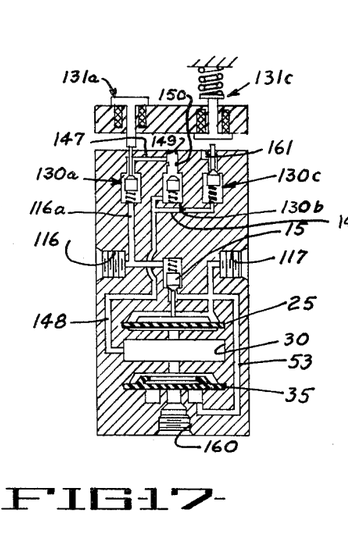
Figure 18:
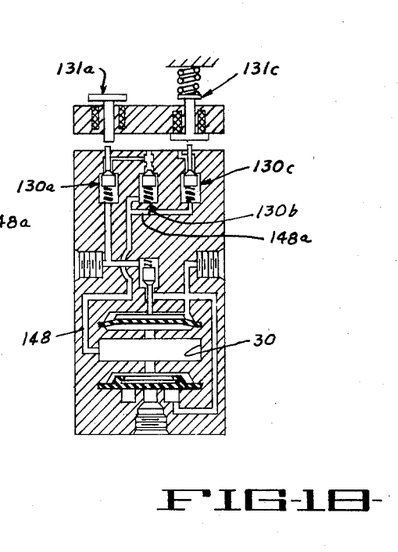
Figure 19:
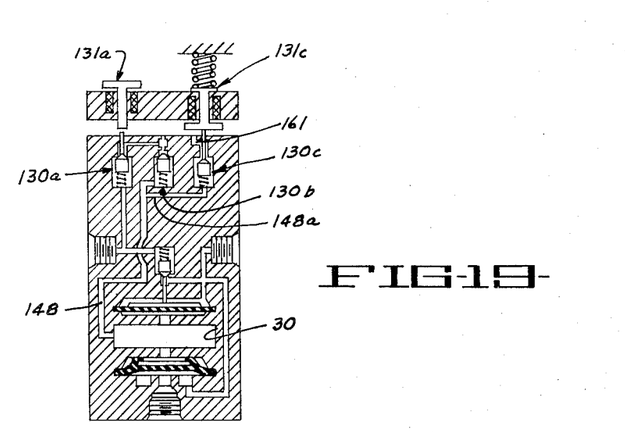

Referring now to the diagrammatic drawings of FIGS. 17 to 19 and more particularly to FIG. 17, the three valves 130a, 130b and 130c are there shown with the solenoids 131a and 131c energized, thereby holding the valve 130a in open position and the valve 130c in closed position. The restrictions 149 and 150 are shown diagrammatically in FIG. 17. It will be seen that the restriction 149 vents into an enclosed chamber 151 (see FIG. 10). An O-ring is provided at 152 to prevent leakage of gas from the chamber 151 to the atmosphere.

During loading of the dome 30, with the regulator in the condition shown in FIG. 17, inlet pressure is communicated by way of a passage 116a to the loading valve 130a, thence through the passage 147 (a portion of which is shown in FIG. 11) to the check valve 130b, and through its restriction 150 and its seat ring 140 to the passage 148 and the dome 30. The restriction 150 serves to prevent excessively rapid loading of the dome 30.

When the outlet pressure has reached the desired value the solenoid 131a is de-energized. The control valves 130a, 130b and 130c will then be in closed position as shown in FIG. 18. The check valve 130b will prevent leakage of pressure from the dome 30.

Referring now to FIG. 19, when it is desired to vent the dome 30 and to shut off the supply of pressure to the outlet 117 the solenoid 131c is de-energized, thereby opening the vent valve 130c. Dome 30 vents through passage 148a to valve 130c thence out through passage 161 into chamber 151.

Referring now to FIGS. 9, 10 and 17, an added safety feature will now be described. As will be seen from FIG. 9, pressure trapped downstream from the main valve 15, when the regulator is vented and shut off, is relieved through passage 53 by means of relief diaphragm 35 to vent opening 160. Referring to FIG. 10, it will be seen that chamber 151 is connected by a passage 168 to vent opening 160. Therefore, gas vented through restriction 149 and through vent passage 161 from vent valve 130c (see FIG. 17) is gathered in vent opening 160, as is gas which is vented by relief diaphragm 35. Therefore, if the vented gas is dangerous (e.g., if it is combustible, or toxic) or if it is costly and requires recovery, it is all gathered at 160 and can be connected to a collection vessel, or destructor or to a safe location for venting to the atmosphere.

Referring now to FIGS. 12 and 13, an alternative (and preferred) orifice element is there shown. This orifice element, which is designated by the reference numeral 162, has chamfered edges and it is formed on one face with a radial groove 163 and on the other face with a radial groove 163a. The element 162 will be used in place of the parts 145 and 146 of FIG. 11, and the grooves 163 and 163a will serve as restricted orifices in place of the slots 149 and 150 in FIG. 11. The grooves 163 and 163a may be different; e.g., one may be longer and/or deeper than the other, so that different requirements of the loading orifice and the venting orifice can be met.

Figures 14, 15:
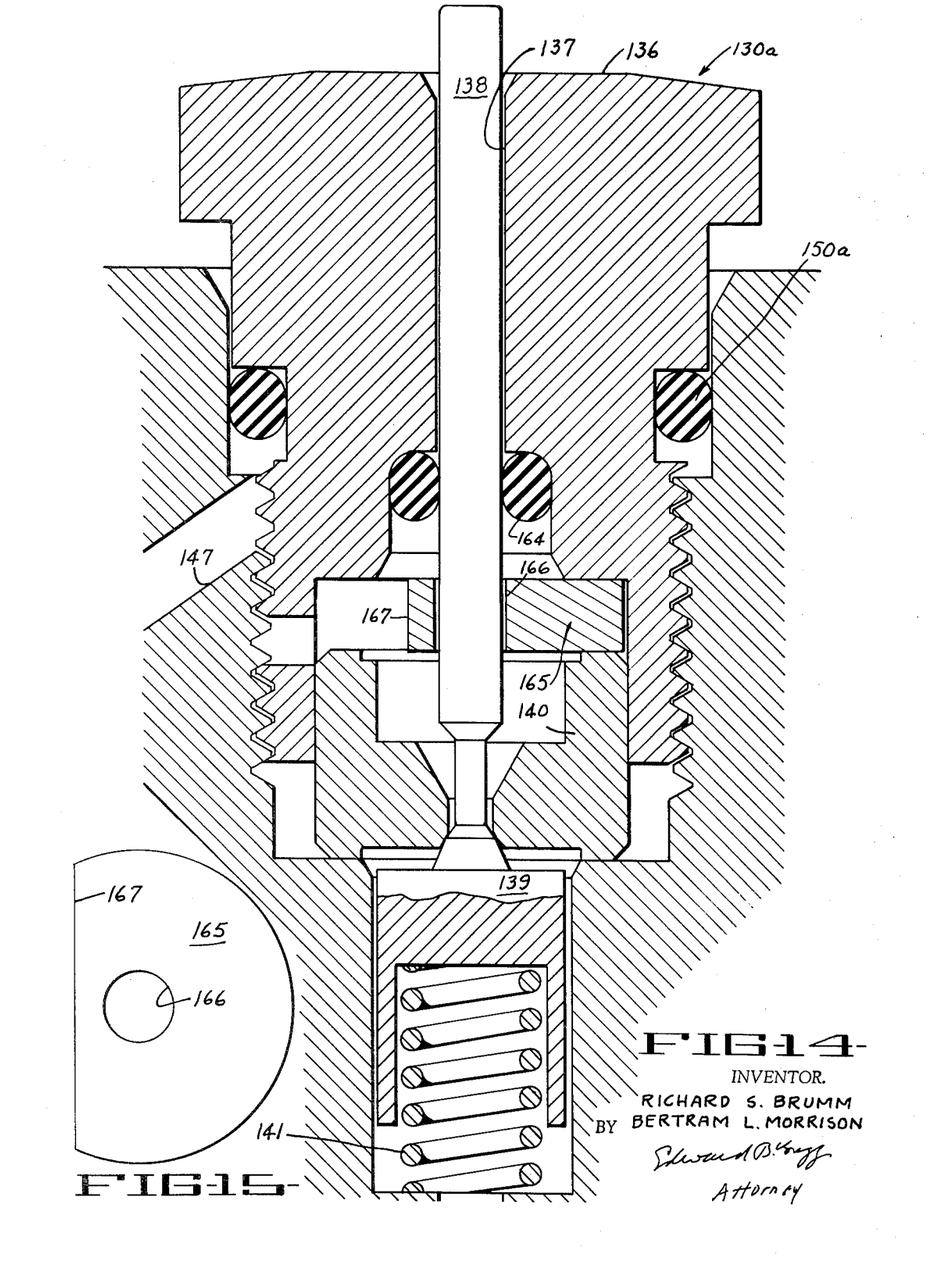
FIG. 14 is a view similar to that of FIG. 11 but of one of the other control valves shown in FIG. 10.
FIG. 15 is a top plan view of the orifice element of the valve of FIG. 14.
Figure 16:
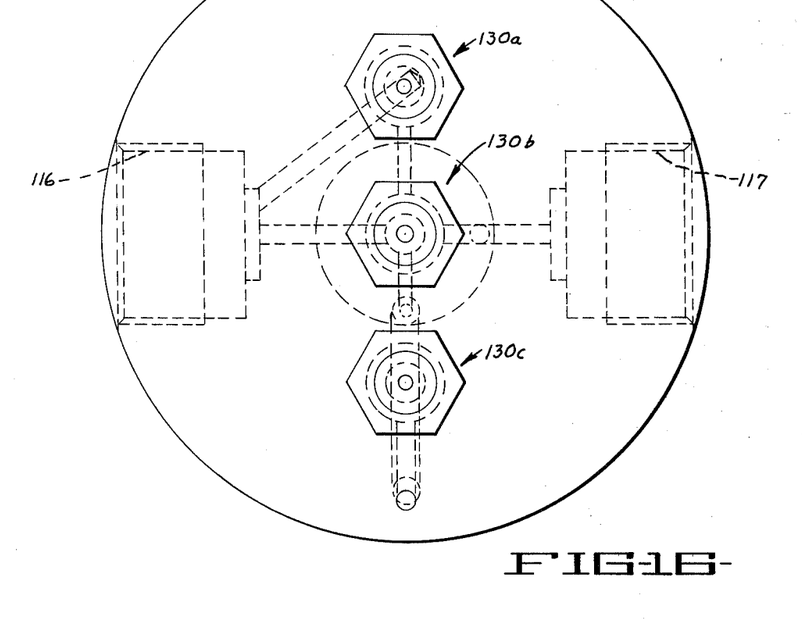
FIG. 16 is a top plan view of the regulator of FIGS. 9 and 10 but with the solenoid section removed, such being a view as seen generally along the line 16—16 of FIG. 9.

Referring now to FIG. 14, the loading valve 130a is there shown on the same enlarged scale as FIG. 11. This valve is identical with valve 130b shown in FIG. 11 except as follows: A thrust pin 138 is slidable in axial passage 137 and a resilient O-ring seal 164 acts to prevent escape of pressure through this passage. Pressure from inlet 116 reaches the valve through passage 116a (see FIGS. 10 and 17) and pressure from this valve passes to check valve 130b through passage 147 (see FIGS. 10 and 17). Valve 130a is also provided with an orifice element 165 which is in the form of a disc having a central hole 166 therethrough to receive thrust pin 138 and which has a segment cut off along a chord at 167. When the valve member 139 is unseated, pressure passes through the passageway formed by this cutaway portion and through the loose thread of nut 136 and body part 112 to passage 147.

The valve 130c is identical except for the connections to and from such valve. Also, in valve 130c the O-ring seal 164 need not be used.

The venting orifice 149 shown diagrammatically in FIGS. 17 to 19 and in detail in FIG. 11 corresponds to the bleed passage 92 and needle valve 93 of FIGS. 5 to 8. However, the orifice 149 is not used for controlled venting (e.g., slow venting for pressure reduction) as is the bleed passage 92. The orifice 149 performs a safety function in that, if loading valve 130a is closed but leaks, the gas which leaks past valve 130a will vent through orifice 149 and will not open check valve 139, which would result in a gradual increase of pressure in dome 30.

Referring now to FIGS. 20 to 24, a third embodiment of the invention is there illustrated which is identical with that shown in FIGS. 9 and 10 except for the mechanism employed to operate the control valves 130a and 130c, such mechanism comprising push buttons and levers which will now be described.

Figure 20:
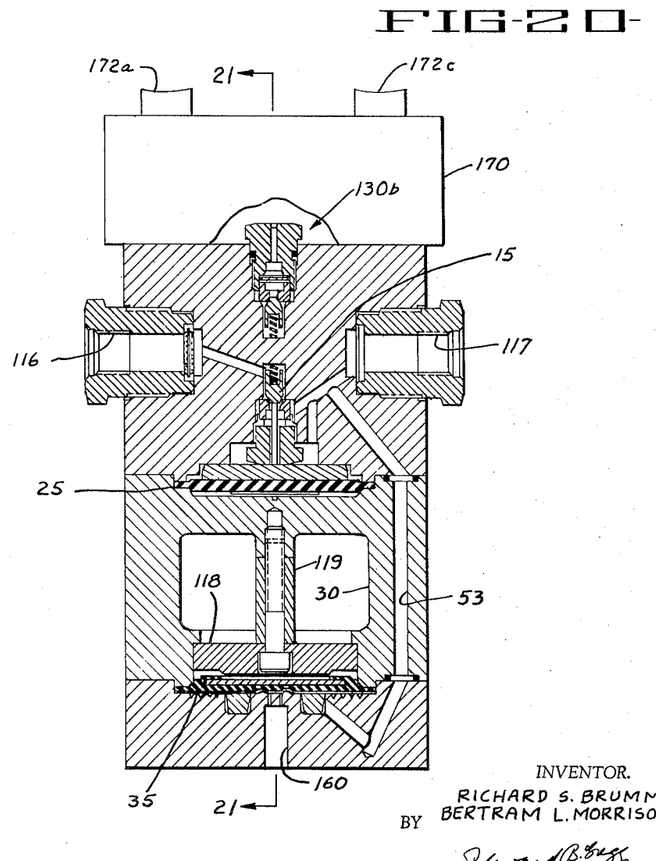
FIG. 20 is a view partly in side elevation and partly in vertical section of the same regulator shown in FIG. 9 but with a push-button operating mechanism instead of a solenoid operating mechanism.
Figure 21:
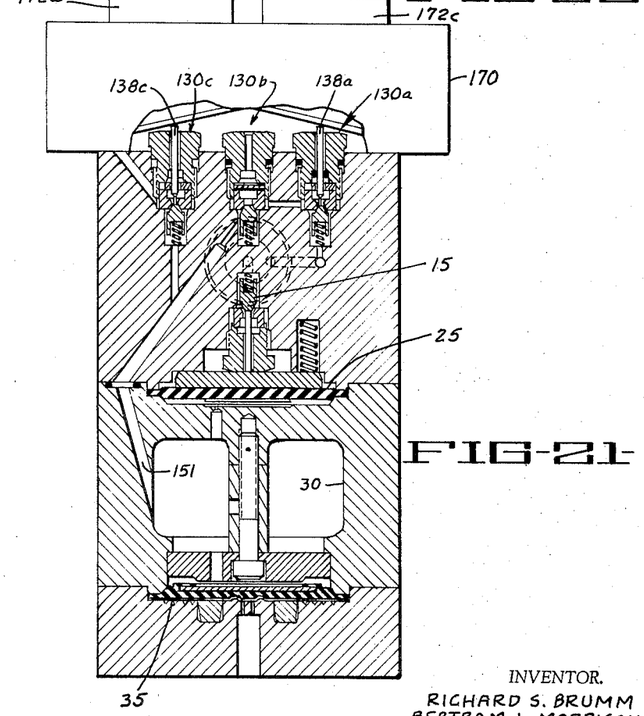
FIG. 21 is a view partly in side elevation and partly in section, the section being taken along the line 21—21 of FIG. 20.
Figure 22:
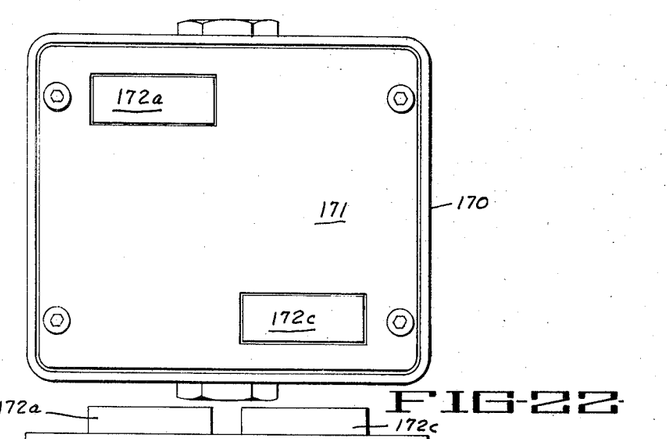
FIG. 22 is a top plan view of the regulator of FIG. 20 as seen from above.

Referring preliminarily to FIGS. 20, 21 and 22, a casing 170 is provided which is mounted on top of the body of the regulator 110a and which has within its confines a cover plate 171 through which project push buttons 172a and 172c to operate the loading valve 130a and the venting valve 130c, respectively.

Figure 23:
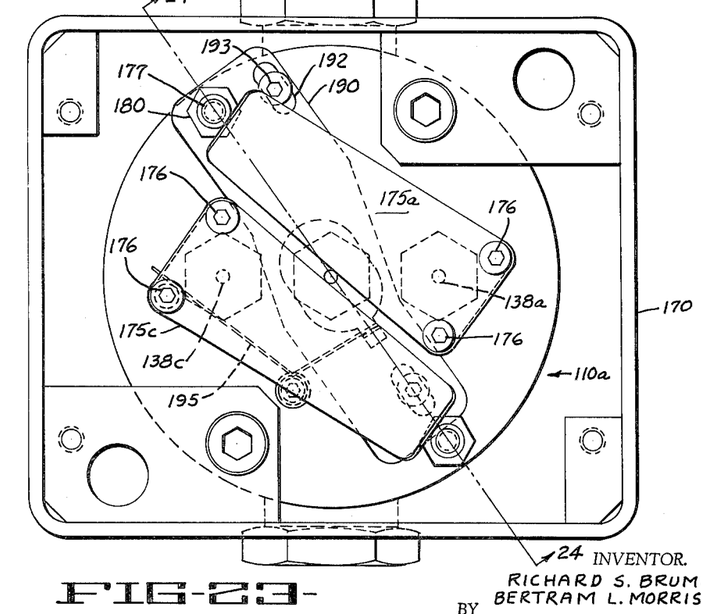
FIG. 23 is a view similar to that shown in FIG. 22 but on a larger scale and with the cover plate removed.
Figure 24:
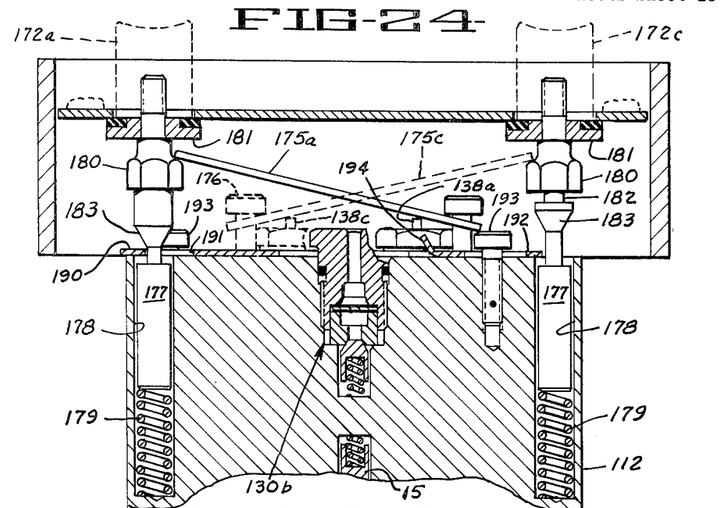
FIG. 24 is a section taken along the line 24—24 of FIG. 23.

Referring now more particularly to FIGS. 23 and 24, thrust pins 138a and 138c of valves 130a and 130c, respectively, are shown. The thrust pin 138a of valve 130a is actuated by a lever 175a which is pivoted at one end on studs 176 and whose other end is operated by the push button 172a. Similarly, the thrust pin 138c of valve 130c is operated by a similar lever 175c, which is pivotively mounted at one end on studs 176 and whose other end is operated by a push button 172c. Each of the push buttons 172a and 172c is fixed to the upper end of a rod 177 which is slidable in a socket 178 formed in the top section 112 of the regulator body. Each rod 177 is urged upwardly by a spring 179. Each of the rods 177 is formed with a projecting flange element 180 and above this flange there is provided a stop member or plate 181. The free end of each lever is lodged within the annular groove formed by the respective members 180 and 181. The rod 177 affixed to the push button 172c is also formed with an annular groove 182 and each of the rods 177 is formed with a conical cam section 183. The operating structure for the valves 130a and 130c is also provided with a latching plate or bar 190 which is formed at one end with a slot 191 which receives the rod 177 affixed to push button 172a. As will be seen, the bar 190 is beneath and adjacent the cam portion 183 of such rod when the rod is in its up position. The latch bar 190 is also formed with a slot 192 at its other end which receives a stud or screw 193 to act as a guide, and it is also formed with an upwardly projecting tongue 194, which is best shown in FIG. 24 and which engages a leaf spring 195 as shown in FIG. 23, which normally urges the latch bar 190 to the right as viewed in FIG. 24.

In operation, and assuming that it is desired to load the dome 30, push button 172a is depressed thereby opening loading valve 130a and it is held depressed until the outlet pressure has reached the desired value. In its downward movement the cam portion 183 of the rod 177 will cam or push the latch bar 190 to the left as viewed in FIG. 24 and when the desired outlet pressure is reached and the push button 172a is released and is caused to return to its normal up position by the spring 179, the latch bar 190 will be released and will return to its normal position shown in FIG. 24. When it is desired to vent the dome, the push button 172c is depressed and, during its downward movement, its cam portion 183 will move the latch bar 190 to the left (as viewed in FIG. 24) against the force of spring 195 until the right-hand end of the latch plate 190 has cleared the cam portion 183. As the rod 177 moves farther down, the latch bar will snap into the annular groove 182. This will have the effect of automatically locking the push button 172 in its down position and will hold the vent valve 130c in its open, venting position. When it is desired to load the dome 30, the push button 172a is depressed. As explained above, its cam 183 will move the latch plate 190 to the left thereby detaching the right-hand end of the latch bar from the locking groove 182. Therefore, the spring 179 associated with push button 172c will push its rod 177 and the push button 172c to up position, thereby closing the vent valve 130c.

In the operation of the push button arrangement of FIGS. 20 to 24, the following advantages are to be noted: The rate of loading and the rate of venting can be controlled by the degree to which button 172a or 172c, respectively, is pushed in, thus, if button 172a is pushed in slightly, it will open valve 130a slightly and the dome pressure will increase slowly; whereas by pushing button 172a in farther or all the way, the rate of loading is increased. Similarly, the dome can be vented very slowly, very rapidly or at an intermediate speed by pushing in button 172c only slightly, all the way or to an intermediate degree. Also, cam 183 associated with button 172a can be designed or adapted in relation to latch bar 190 that it will unlatch button 172c at the start of downward travel of button 172a. Therefore, assuming that the regulator has been shut down and valve 172c is locked in open position, and it is desired to load the regulator, as soon as button 172a is depressed, push button 172c is released, the dome commences loading immediately and no gas is vented through valve 138c.

It will, therefore, be seen that several embodiments of a pressure regulator have been provided which are very advantageous. The regulator can be easily, quickly and reliably adjusted, pressurized and vented. Numerous features are incorporated which result in more efficient operation, easier operation, easy adjustment, easy assembly, disassembly and repair, and other advantages.

We claim:

1. A loading device for a fluid pressure regulator comprising:
  a housing including a loading passageway adapted to be connected from a source of pressure fluid to a sensing chamber,
  first and second control valves arranged in series in said loading passageway,
  means forming a first orifice in said loading passageway to restrict flow therethrough when said first and second control valves are opened,
  a relieving duct connected from said loading passageway at a location therein between said first and second control valves to a region of low pressure to conduct leakage from said first control valve,
  first actuating means for opening said first control valve,
  said second control valve being a check valve including resilient means biasing it closed in opposition to pressure of fluid flowing from said first control valve,
  a venting passageway connected from said sensing chamber to a low pressure region,
  a normally closed third control valve in said venting passageway, and
  third actuating means for opening said third control valve.

2. The loading device defined by claim 1 wherein:
  each actuating means comprises a movable valve operating member, resilient means biasing said operating member toward a first position wherein the valve controlled thereby is conditioned to close, said operating member being movable manually to a second position to open the valve controlled thereby,
  and including:
  an interlock device engaging said third actuating means when in the second position thereof to hold it therein, and
  release means movable when said first actuating means is moved to said second position to engage said interlock device and move it out of interlocking engagement with said third actuating means.

3. The loading device defined by claim 1 wherein said third actuating means comprises:
  a movable third control valve operating member,
  means operative when energized electrically to move said operating member toward a first position wherein said third control valve is closed, and
  resilient means biasing said third control valve operating member toward a second position wherein said third control valve is open,
  so that interruption of electrical current will result in opening of said third control valve.

4. A loading device for a fluid pressure regulator comprising:
  a housing including a loading passageway adapted to be connected from a source of pressure fluid to a sensing chamber,
  a first control valve in said loading passageway,
  first actuating means for opening said first control valve,
  means forming a venting passageway opening from said chamber,
  a normally closed third control valve in said venting passageway,
  third actuating means for opening said third control valve,
  means in said housing forming a low pressure chamber,
  an escape conduit opening into said low pressure chamber,
  a relief valve in said escape duct,
  a pressure-responsive member operating said relief valve,
  a passageway adapted to conduct a variable source of regulated pressure to said relief valve pressure-responsive member,
  a check valve in said loading passageway downstream from said first control valve,
  resilient means biasing said check valve closed in opposition to pressure of fluid from said first control valve,
  a relieving duct opening from said loading passageway at a location therein between said first control valve and said check valve, and
  conduit means connecting said low pressure chamber to said venting passageway and said relieving duct.

5. A device for loading a pressure chamber comprising:
  a housing including a first loading passageway section adapted to be connected to a source of fluid under pressure,
  a first control valve in said first loading passageway section,
  first actuating means for opening said first control valve,
  a second loading passageway section communicating with said pressure chamber,
  a check valve in said second loading passageway section including means biasing it closed in opposition to pressure from said first control valve,
  an orifice duct connecting the upstream side of said check valve with a low pressure region,
  means forming a pair of spaced orifices arranged in series in said orifice duct,
  an intermediate loading passageway section connected from the outlet of said first control valve to said orifice duct intermediate said spaced orifices,
  a venting passageway connected from said pressure chamber to a low pressure region,
  a normally closed third control valve in said venting passageway, and
  third actuating means for opening said third control valve.

6. The device defined by claim 5 wherein said orifice forming means comprises:
  a disc,
  means forming at least one generally radially extending slot on each side of said disc, and
  opposed annular means clamping said disc across said orifice duct at the axial location of the outlet of said intermediate loading passageway.

References Cited by the Examiner
UNITED STATES PATENTS

| | | | |
|---|---|---|---|
| 862,867 | 8/1907 | Eggleston. | |
| 1,797,277 | 3/1931 | Thomas | 138—42 |
| 2,164,095 | 6/1939 | Thomes | 137—505.14 X |
| 2,487,650 | 11/1949 | Grove | 137—505.11 |
| 2,511,529 | 1/1950 | Copping | 251—126 |

(Other references on following page)

UNITED STATES PATENTS

| | | | |
|---|---|---|---|
| 2,700,983 | 2/1955 | Bryant | 137—505.11 |
| 2,791,236 | 5/1957 | Maver | 137—608 |
| 2,963,040 | 12/1960 | Zimmer | 137—505.11 |
| 2,964,288 | 12/1960 | Holmes | 251—126 |
| 2,971,537 | 2/1961 | Kowalski | 137—505.11 X |
| 2,976,885 | 3/1961 | Garraway | 137—608 |
| 3,036,596 | 5/1962 | Alfieri | 137—636.1 |
| 3,088,486 | 5/1963 | Salmon | 137—505.42 X |

FOREIGN PATENTS 694,401   12/1930   France.

ISADOR WEIL, *Primary Examiner.*

WILLIAM F. O'DEA, *Examiner.*